Patented Nov. 11, 1924.

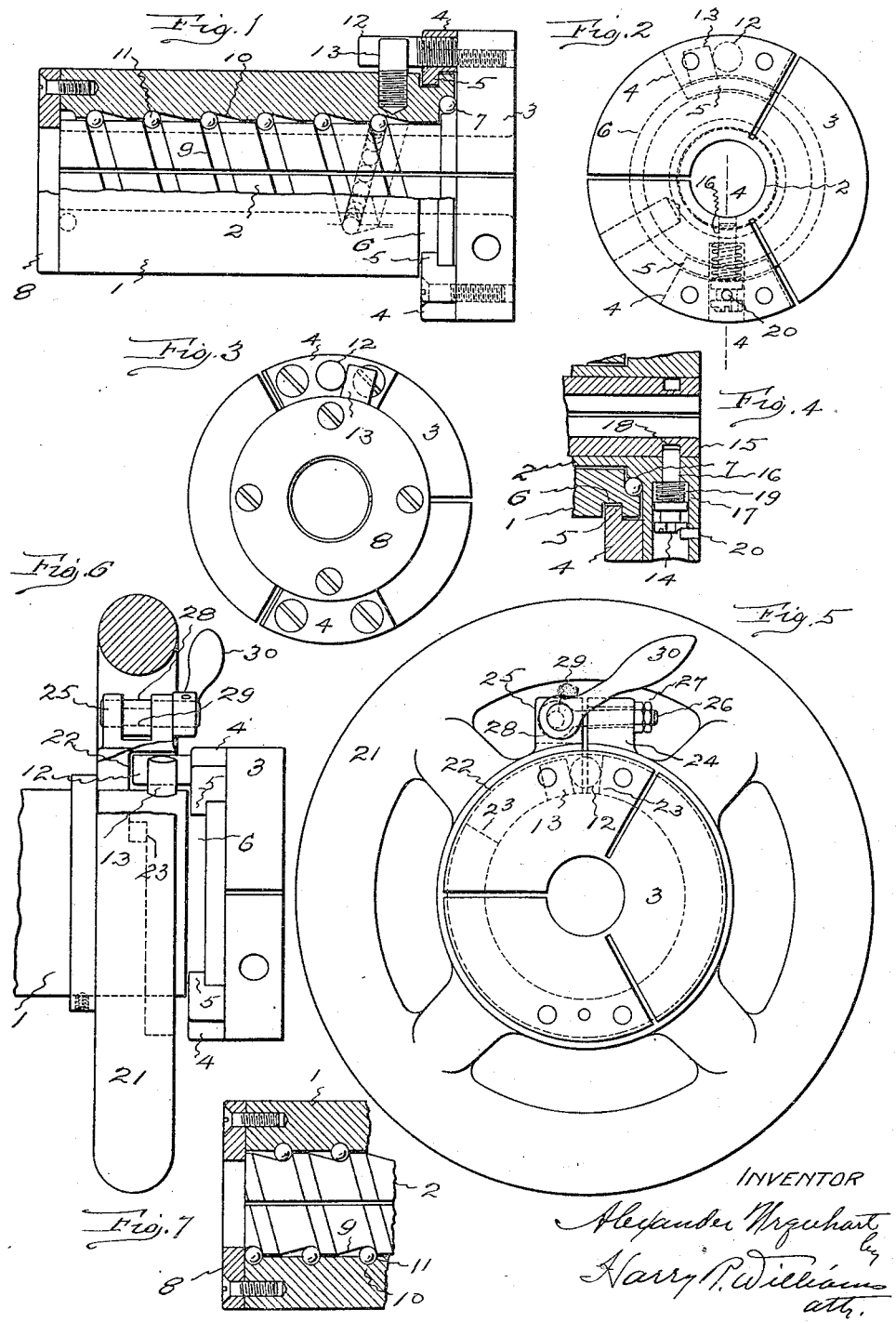

1,514,640

UNITED STATES PATENT OFFICE.

ALEXANDER URQUHART, OF DERBY, CONNECTICUT.

CHUCK.

Application filed April 28, 1923. Serial No. 635,321.

*To all whom it may concern:*

Be it known that I, ALEXANDER URQUHART, a citizen of the United States, residing at Derby, in the county of New Haven and State of Connecticut, have invented a new and useful Improvement in Chucks, of which the following is a specification.

This invention relates to those chucks which have but a relatively small opening and closing range and that are adapted to be applied to engine lathes, turret lathes, screw machines, grinders, boring mills, drill presses and similar machine tools, for receiving and holding pieces of work of substantially uniform size, interchangeable bushings of various capacities for pieces of different sizes and character being provided for one body. Such chucks while particularly adapted to hold rods, bars, and tubes, are capable of holding other classes of stock and operating tools.

The object of the invention is to provide a very simple, cheap and durable construction which can be easily and quickly opened for releasing the piece which is held, and powerfully closed for gripping a piece, the contractive action of the chuck being caused in such manner that the work will be centered and turn true and the strain incident to the resistance offered by the work will tend to increase the grip of the chuck on the piece being held.

In attaining this object a hollow sleeve, slitted so that it may be radially contracted, is rotatably fitted but longitudinally held within a hollow cylindrical body. On the exterior of the sleeve and interior of the body are complementary spiral grooves of such shape and occupied by means of such form that when the body is rotated one way with relation to the sleeve said means are forced into a position between the parts which causes the sleeve to contract, and when the body is rotated in the opposite direction said means assume a position which permits the sleeve to expand to normal size.

In the accompanying drawings Fig. 1 shows a side view with a part of the body cut in central longitudinal section, of a chuck that embodies the invention. Fig. 2 is a view of one end of the chuck. Fig. 3 is a view looking toward the other end. Fig. 4 is a section of an end of the chuck on the plane indicated by the dotted line 4—4 on Fig. 2, with a reducing bushing held in the sleeve. Fig. 5 is an end view of the chuck provided with a hand wheel for convenience of operation. Fig. 6 is a side view of the end of the chuck and hand wheel, with the rim of the wheel cut away to show means provided for clamping the wheel on the body. Fig. 7 shows a section of one end of the body and side view of the sleeve with a modified arrangement of spiral grooves.

The body 1 of the chuck is a hollow cylinder and the sleeve 2 is a hollow cylinder fitted to rotate but held against longitudinal movement in the body. The walls of the body are solid, that is, they are not expansible, while the walls of the sleeve within the body are slitted in such manner that they can be contracted in order to reduce the bore of the sleeve. At one end the sleeve has an enlarged head 3 which is of course also slitted. Fastened to the inside face near the edge of the head are plates 4 which have flanges 5 that extend into a groove 6 around the body for the purpose of preventing relative endwise movement of the parts. Balls 7 are desirably placed between this end of the body and the inside of the head to relieve the longitudinal thrust of the parts when in operation. Fastened to the other end of the body is a ball retaining ring 8.

A spiral groove 9 is cut around the exterior of the slitted sleeve and a spiral groove 10 is cut around the interior of the solid body. These grooves are complementary and they may be either right-hand or left-hand spirals as desired. In the form illustrated in Fig. 1 the groove in the sleeve is approximately semi-circular in cross section and the groove in the body has a wedge-shaped bottom. In the form shown in Fig. 7 the groove in the body is semi-circular while the groove in the sleeve is wedge-shaped in cross section. Completely filling the grooves around the slitted sleeve, with substantially half in the sleeve and half in the body, are balls 11, practically as shown and described in Patent #1,464,551 granted to me August 14, 1923.

Rotating the body, of the form first shown, in one direction with relation to the sleeve has the effect of crowding the balls into the shallower portions of the groove in the body and this causes the balls to exert an inward pressure uniformly around the sleeve so that the bore of the sleeve will be contracted. Turning the body of this form in the opposite direction carries the balls into the deeper portions of the groove in the body and permits the sleeve to expand. In the second form rotating the body in one direction has the effect of crowding the balls into the shallower portions of the groove in the sleeve and this causes them to exert an inward contracting pressure on the sleeve. Turning the body in the opposite direction of this form carries the balls into the deeper portions of the groove in the sleeve and allows the sleeve to expand. The spiral pitch of the grooves is desirably in such direction that the rotatable back pressure on any piece of work that is held in the sleeve, caused by the cutting action of a tool, or the pressure on any tool that is in the sleeve, caused by its work, will tend to contract the sleeve onto the work or the tool shank.

A pin 12 may be screwed into the head or one of the plates fastened to the head, and a pin 13 may be screwed into the body, in such relation that the body will not turn backward beyond a definite point.

To enable the chuck to hold smaller work than the bore of the sleeve itself will hold, a bushing 15, (Fig. 4) having an outside diameter that will just fit into the bore of the sleeve and which is slitted so that it may be contracted, may be placed in the sleeve. This bushing which can have any desired bore may be retained in place by a pin 16 located in a socket 17 in the head of the sleeve. The inner end of the pin is adapted to enter a groove 18 around the bushing. A spring 19 tends to push this pin out. When it is desired to fasten a bushing in the sleeve the pin is pushed in and turned by a screw driver or other tool so that its head will engage back of a stud 20, a slot 14 being made through the head of the pin so that when turned to one position it can be pushed in or allowed to spring out past the stud.

For the purpose of facilitating the opening and closing of the chuck a hand wheel 21 may be mounted to turn loosely on the body. This wheel is located adjacent to the head of the sleeve in such position that the pin 12 will project from the sleeve head into a recess 22 in the hub of the hand wheel. The end walls 23 of the recess in the hub are adapted to engage the pin 12 and through it turn the sleeve relatively to the body which is held against rotation at this time. The hub of this hand wheel is slitted so that it may be contracted and clamped to the body for holding the chuck closed on a piece of work. For this purpose the hub of the hand wheel adjacent to the slit is provided with lugs 24 and 25, through the former and into the latter of which extends a bolt 26 provided with nuts 27 by means of which its longitudinal position may be adjusted. The head 28 of the bolt is drilled to take the eccentric shaft 29 which is pivoted in the lugs 25 and provided with a handle 30 by means of which it may be turned. Turning the handle one way contracts the hub and clamps the hand wheel to the body. Turning the handle oppositely frees the wheel on the body. When the chuck has been closed by turning the hand wheel on the body, through the engagement of a wall 23 of the recess in the hub with the pin 12, and the wheel is then locked to the body the sleeve cannot turn back so as to loosen its hold on the article being held therein. The hand wheel provides a very convenient operating means in case the article held by the chuck cannot be conveniently grasped when the chuck is being tightened on it or loosened from it. The pitch of the spiral and the wedge angle of the ball grooves are so related that an extremely powerful contractive force can be developed by the application of a small amount of power to and little movement of the hand wheel. If a heavy cut is taken the resistance of the work to the action of the tool is in such direction that the pressure tends to increase the hold of the sleeve on the part which it is holding. As the inward pressure of the balls is uniformly distributed about the sleeve the sleeve is contracted in such a way that it will normally hold the work centrally true.

The invention claimed is:—

1. A chuck comprising a body, a contractile sleeve rotatably fitted within and held from longitudinal movement with relation to the body, a spiral groove formed in the exterior of the sleeve, a spiral groove formed in the interior of the body, and means extending into the body and sleeve loosely occupying said grooves and adapted to be forced radially inward and contract the sleeve when the body is rotated in one direction with relation to the sleeve.

2. A chuck comprising a body, a slitted sleeve rotatably fitted within and held from longitudinal movement with relation to the body, complementary spiral grooves in the interior of the body and on the exterior of the sleeve, and means extending into the body and sleeve loosely occupying said grooves and adapted to be forced radially inward and contract the sleeve when the body is rotated in one direction with relation to the sleeve.

3. A chuck having a body, a section of the interior of which is provided with a spiral groove that has a tapered bottom, a sleeve rotatably fitted in the body and provided on its exterior with a semi-circular spiral groove, and balls occupying said grooves and adapted when the body is rotated in one direction with relation to the sleeve to contract the sleeve.

4. A chuck having a body, a section on the interior of which is provided with a spiral groove that has a tapered bottom, a sleeve rotatably fitted in the body and provided on its exterior with a semi-circular spiral groove, and means arranged in said grooves and adapted to contract the sleeve when one part is given a rotative movement relative to the other part.

5. A chuck comprising a body, a contractile sleeve rotatably fitted in and held from longitudinal movement with relation to the body, complementary spiral grooves in the interior of the body and on the exterior of the sleeve, means extending into the body and sleeve and loosely filling said grooves to affect the contracting of the sleeve when the body is rotated in one direction with relation to the sleeve, and stop pins projecting from the sleeve and body to limit the backward movement of the body with relation to the sleeve.

6. A chuck comprising a body, a contractile sleeve rotatably fitted within the body, complementary spiral grooves in the interior of the body and on the exterior of the sleeve, means located in said grooves to affect the contraction of the sleeve when the body is rotated in one direction with relation to the sleeve, stop pins projecting from the sleeve and body to limit the backward movement of the latter with relation to the former, and a hand wheel arranged to engage the pin projecting from the sleeve for turning the sleeve.

7. A chuck comprising a body, a contractile sleeve rotatably fitted within and held from longitudinal movement with relation to the body, a spiral groove formed in the interior of the body, a spiral groove formed on the exterior of the sleeve, and balls extending into the body and sleeve and filling these grooves and adapted to contract the sleeve when the body is rotated in one direction with relation to the sleeve.

8. A chuck having a body with an interiorly threaded section, a contractile sleeve having an exteriorly threaded section rotatably fitted in and held from longitudinal movement with relation to the body, balls filling the thread grooves, and a hand wheel arranged to turn the body with relation to the sleeve.

9. A chuck having a body with an interiorly threaded section, a contractile sleeve having an exteriorly threaded section rotatably fitted in and held from longitudinal movement with relation to the body, contracting means occupying the thread grooves, a hand wheel arranged to rotate the sleeve with respect to the body, and means for clamping the hand wheel to the body.

10. A chuck comprising a body, a contractile sleeve rotatably mounted within and held from longitudinal movement with relation to the body, complementary spiral grooves in the interior of the body and on the exterior of the sleeve, balls located in said grooves and adapted to contract the sleeve when the sleeve is turned in one direction with relation to the body, a hand wheel rotatably mounted on the body, and means for clamping the hand wheel to the body.

ALEXANDER URQUHART.